Figure 3:
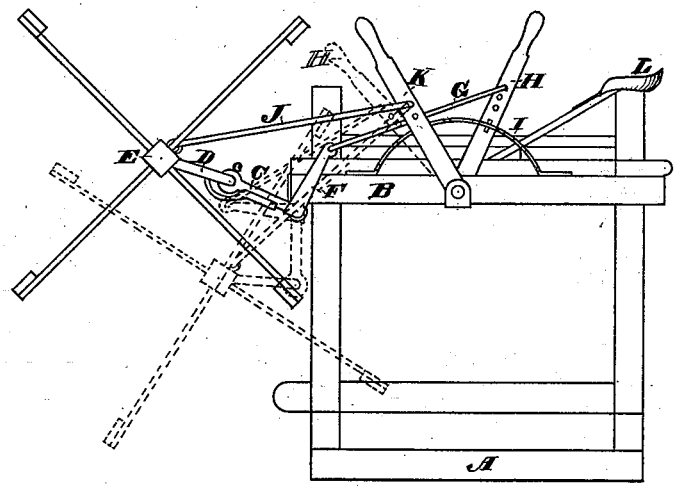

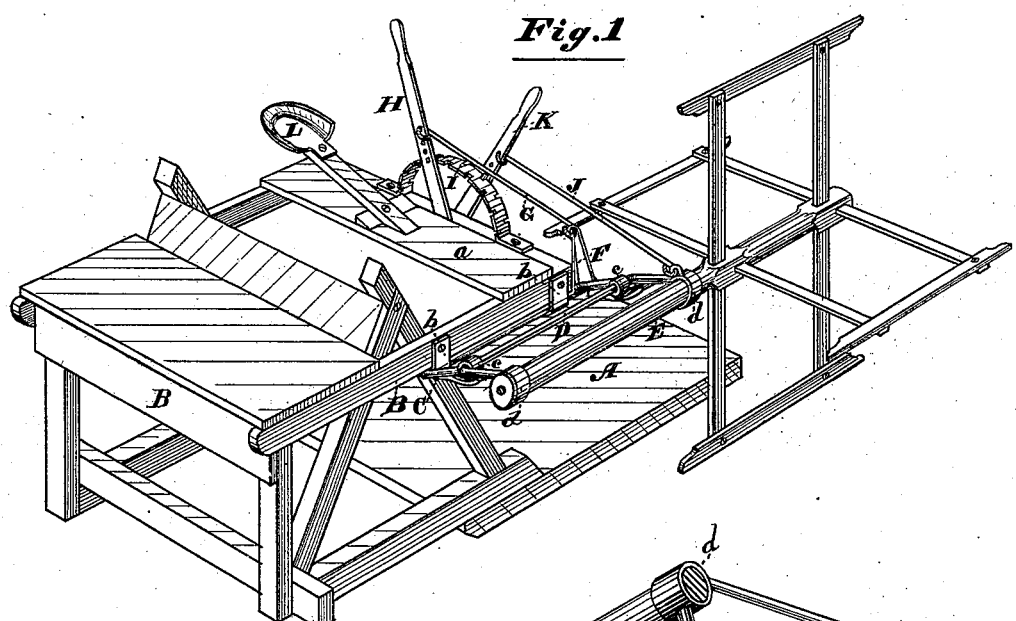
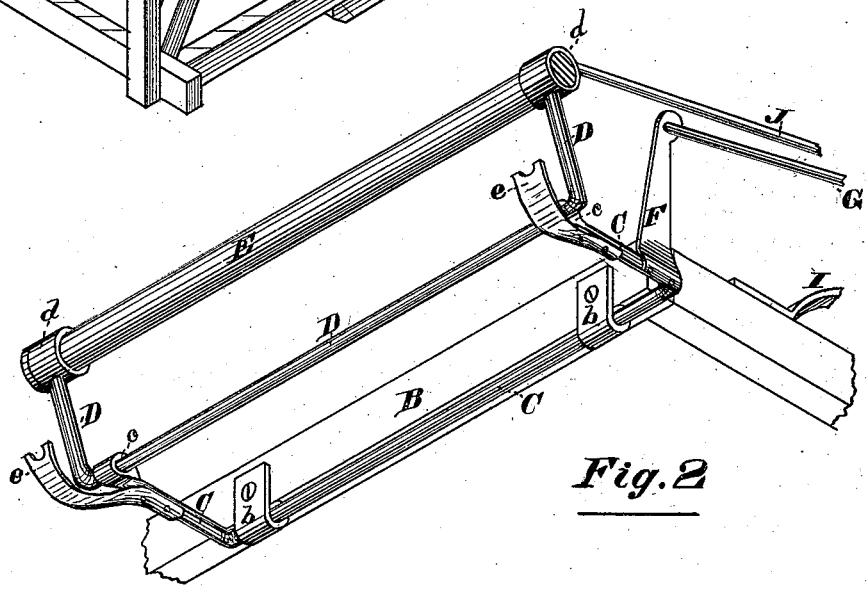

A. SHOGREN.
HARVESTER-REEL.

No. 187,057. Patented Feb. 6, 1877.

Attest
W. S. Baker
L. W. Harris

Inventor
Andrew Shogren
By Coburn & Thacher
Attorneys.

UNITED STATES PATENT OFFICE.

ANDREW SHOGREN, OF SANDWICH, ILL., ASSIGNOR OF ONE-HALF OF HIS RIGHT TO HENRY A. ADAMS AND J. PHELPS ADAMS, OF SAME PLACE.

IMPROVEMENT IN HARVESTER-REELS.

Specification forming part of Letters Patent No. 187,057, dated February 6, 1877; application filed June 22, 1876.

*To all whom it may concern:*

Be it known that I, ANDREW SHOGREN, of Sandwich, in the county of De Kalb and State of Illinois, have invented a new and useful Improvement in Harvesters, which is fully described in the following specification, reference being had to the accompanying drawings, in which—

Figure 1 is a perspective view of a harvester with my reel-support attached; Fig. 2, a perspective view of the reel-support, looking from the under side; and Figs. 3 and 4, end elevations, showing the reel in various positions obtained by adjusting the hinged supporting-frame.

The object of my invention is to provide an adjustable support for the reel-shaft, whereby the position of the latter may be very quickly and easily changed, both vertically and horizontally.

The invention consists in a double-hinged vibrating frame, which constitutes the support of the reel-shaft. The invention also consists in the combination of the double-hinged reel-supporting frame with suitable levers and connecting-rods, whereby the adjustment of the reel-shaft in any direction is placed entirely under the control of the driver.

In the drawings, A represents the grain-platform of a harvester, and B the upright frame-work, which supports the grain-elevating apparatus and grain-receiver. A three-sided frame, C, is supported in bearings $b$ on the frame B, or otherwise hinged to said frame so that it is free to vibrate up and down. The frame is attached to the frame-work of the harvester, so that the free end bars will project outward, as shown in the drawings. The outer ends of these bars are turned or bent, so as to form eye-bearings $c$, in which is mounted a second frame, D. The frame D is also three-sided, and similar to the frame C, except that it is a little longer than the latter, so that it is free to turn in its bearings $c$ without interfering with the frame C. Upon the outer ends of the frame D are suitable bearings $d$, in which is mounted the reel-shaft E.

An arm, F, is rigidly attached to one of the end bars of the frame C, to which is attached a connecting-rod, G, which extends back and is linked to a lever, H, pivoted to the main frame, and engaging in any suitable manner with one side of a double-notched rack or segment, I. A second connecting-rod, J, is hooked to the outer end of one of the end bars of the frame D, and extends back and is attached to another lever, K, which is also pivoted to the main frame of the machine, and engages with the notches on the other side of the segmental rack I.

A driver's seat, L, is mounted upon a cross-plank, $a$, of the frame-work of the machine, in close proximity to the levers H and K, so that the latter can be easily reached by the driver on his seat. If desired, stops $e$ may be attached to the end bars of the frame C, against which the end bars of the frame D will strike, and thus prevent the reel-shaft from falling below a certain point. This may be necessary to prevent the reel-shaft from dropping below the line of the bearings $c$ $c$—a position from which it would perhaps be difficult to remove it by means of the lever K and rod J.

It will be seen that each of the frames C and D may be oscillated independently of the other, and that by means of these two oscillating frames, constituting together a double support for the reel-shaft, the latter may be adjusted to any position desired.

Figure 4:
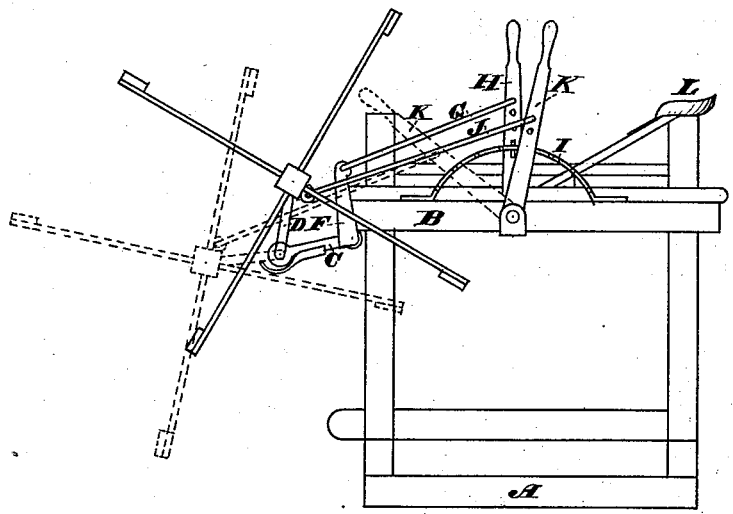

The main function of the frame C is to effect a vertical adjustment of the reel-shaft, and the vibration of the frame D will produce either a vertical or a horizontal adjustment, according to the relative position of the two frames, while by various modifications of the relative position of the two frames the changes in the position of the reel which it is possible to effect are almost endless. A few of these are shown in Figs. 3 and 4 of the drawings; but these figures are only illustrative, and do not by any means comprehend the number of positions in which the reel may be placed. I prefer to construct the frames of tubular rods, for in this way I secure both lightness and strength of material; but they may be made of any suitable material, and may be hinged to each other and attached to the frame of the machine in any suitable manner, provided only they are left free to vibrate independently of each other.

This reel-supporting device is exceedingly light and strong. It is very simple in construction, and, with the connections described, places the adjustment of the reel completely within the easy control of the driver. The reel may be driven by the ordinary cord or chain, suitable compensating devices being employed to accommodate the various positions of the reel-shaft.

The hand-levers and notched segment may be of any ordinary construction which secures a ready adjustment of the levers, and a safe lock for them in any desired position.

Having thus described my invention, what I claim as new, and desire to secure by Letters Patent, is—

1. In a harvesting-machine, a double-jointed reel-support, consisting of the hinged part C and the hinged part D, mounted on the former, in combination with suitable mechanism, whereby the driver in his seat can adjust either or both members of the support while the machine is in motion.

2. The combination of the vibrating frame C, pivoted frame D, connecting-rod J, and lever K, substantially as described.

3. The combination of the hinged frames C and D, reel-shaft E, and levers H and K, connected to the frames C and D, respectively, whereby either of said frames may be vibrated independently of the other, to adjust the reel without stopping the machine, substantially as set forth.

4. The combination of the hinged frames C and D, reel-shaft E, connecting-rods G and J, levers H and K, and double-notched rack I, substantially as and for the purpose set forth.

ANDREW SHOGREN.

Witnesses:
W. C. PHELPS,
J. P. ADAMS.